United States Patent
Kaku et al.

(10) Patent No.: US 9,481,147 B2
(45) Date of Patent: Nov. 1, 2016

(54) LAMINATED BODY

(71) Applicant: NGK INSULATORS, LTD., Nagoya-Shi (JP)

(72) Inventors: Takeshi Kaku, Komaki (JP); Hidehiko Tanaka, Nagoya (JP); Kazuyoshi Shibata, Mizunami (JP); Hideki Shimizu, Obu (JP)

(73) Assignee: NGK Insulators, Ltd., Nagoya (JP)

( * ) Notice: Subject to any disclaimer, the term of this patent is extended or adjusted under 35 U.S.C. 154(b) by 259 days.

(21) Appl. No.: 14/019,820

(22) Filed: Sep. 6, 2013

(65) Prior Publication Data
US 2014/0072785 A1 Mar. 13, 2014

(30) Foreign Application Priority Data
Sep. 13, 2012 (JP) .................. 2012-201134

(51) Int. Cl.
*B32B 7/02* (2006.01)
*B32B 5/26* (2006.01)
(Continued)

(52) U.S. Cl.
CPC . *B32B 7/02* (2013.01); *B32B 5/26* (2013.01); *B32B 5/28* (2013.01); *B32B 7/12* (2013.01); *B32B 9/005* (2013.01); *B32B 9/045* (2013.01); *B32B 27/04* (2013.01); *B32B 27/34* (2013.01); *B32B 27/38* (2013.01); *C04B 37/008* (2013.01); *B32B 2260/021* (2013.01); *B32B 2260/023* (2013.01); *B32B 2260/046* (2013.01); *B32B 2262/101* (2013.01); *B32B 2262/106* (2013.01); *B32B 2307/50* (2013.01); *B32B 2307/54* (2013.01); *B32B 2307/558* (2013.01); *C04B 2235/963* (2013.01); *C04B 2237/343* (2013.01); *C04B 2237/348* (2013.01); *C04B 2237/365* (2013.01); *C04B 2237/366* (2013.01); *C04B 2237/368* (2013.01); *C04B 2237/52* (2013.01); *Y10T 428/2495* (2015.01)

(58) Field of Classification Search
None
See application file for complete search history.

(56) References Cited

U.S. PATENT DOCUMENTS

| 5,330,820 A * | 7/1994 | Li et al. .................. 428/113 |
| 7,642,206 B1 * | 1/2010 | Bhatnagar et al. .......... 428/113 |
| 2002/0033114 A1 | 3/2002 | Suehiro et al. |

FOREIGN PATENT DOCUMENTS

| JP | 06-064076 A1 | 3/1994 |
| JP | 08-072200 A1 | 3/1996 |

(Continued)

OTHER PUBLICATIONS

Hibbler, R. C., "Mechanics of Materials". Pearson Prentice Hall, 8$^{th}$ Ed. (2001).*

(Continued)

*Primary Examiner* — David Sample
*Assistant Examiner* — Donald M Flores, Jr.
(74) *Attorney, Agent, or Firm* — Burr & Brown, PLLC

(57) ABSTRACT

A laminated body is provided that exhibits impact resistance, wear resistance and scratch resistance, and which enables a reduction in weight together with a reduction in the dielectric constant. The laminated body 100 includes a first tabular member 10 configured from a ceramic material and having a first thickness t1, and a second tabular member 20 configured from a polymer material and having a second thickness t2. The laminated body 100 withstands a falling-ball impact breaking test from a height that is higher than that exhibited by a single layer body that is configured from the ceramic material and of a thickness t3 that is the sum of the first thickness t1 and the second thickness t2.

7 Claims, 3 Drawing Sheets

(51) Int. Cl.
*B32B 5/28* (2006.01)
*B32B 7/12* (2006.01)
*B32B 9/00* (2006.01)
*B32B 9/04* (2006.01)
*B32B 27/04* (2006.01)
*B32B 27/34* (2006.01)
*B32B 27/38* (2006.01)
*C04B 37/00* (2006.01)

(56) References Cited

FOREIGN PATENT DOCUMENTS

| | | |
|---|---|---|
| JP | 2005-254487 A1 | 9/2005 |
| JP | 2008-162164 A1 | 7/2008 |
| JP | 2009-028944 A1 | 2/2009 |
| JP | 2009-121774 A | 6/2009 |
| JP | 2009-531648 A | 9/2009 |
| JP | 2010-175211 A | 8/2010 |
| JP | 2011-021127 A1 | 2/2011 |

OTHER PUBLICATIONS

European Search Report (Nov. 21, 2013) Application No. 13183488.9-1303.
Extended European Search Report (Application No. 13183488.9) dated Nov. 21, 2013.
Japanese Office Action, Japanese Application No. 2012-201134, dated Feb. 23, 2016 (4 pages).

* cited by examiner

LAMINATED BODY

CROSS-REFERENCE TO RELATED APPLICATIONS

This application claims priority under 35 U.S.C. §119 to Japanese Patent Application No. 2012-201134, filed on Sep. 13, 2012. The entire disclosure of Japanese Patent Application No. 2012-201134 are hereby incorporated herein by reference.

BACKGROUND OF THE INVENTION

1. Field of the Invention

The technology disclosed herein relates to a tabular laminated body.

2. Description of Related Art

Generally, the outer covering of an electronic device (a digital camera, IC recorder, or the like) is configured by a synthetic resin that exhibits high strength and low weight (see Japanese Laid-Open Patent Application No. 2011-21127).

SUMMARY OF THE INVENTION

However, there is the problem that a synthetic-resin outer covering exhibits low wear resistance and low scratch resistance. In the context, it seemed like a good idea to use a ceramic material that exhibits high wear resistance and high scratch resistance as an outer covering material. However, due to the fact that ceramics are characterized by a tendency to fracture, when the outer covering is only configured from a ceramic material, there is a risk of fracture in the outer covering due to application of an impact force.

In light of the circumstances described above, the technology disclosed herein has the object of providing a laminated body that exhibits impact resistance, wear resistance and scratch resistance, and which enables a reduction in weight together with a reduction in the dielectric constant.

In accordance with one aspect of the technology disclosed herein, a laminated body includes a main body having a first tabular member and a second tabular member. The first tabular member is configured from a ceramic material and has a first thickness. The second tabular member is configured from a polymer material and has a second thickness. The main body is configured to withstand a falling-ball impact breaking test from a height that is higher than a height exhibited by a single layer body which is configured from the ceramic material. The single layer body has a thickness that is the sum of the first thickness and the second thickness.

The technology disclosed herein provides a laminated body that exhibits impact resistance, wear resistance and scratch resistance, and which enables a reduction in weight together with a reduction in the dielectric constant.

BRIEF DESCRIPTION OF DRAWINGS

Referring now to the attached drawings which form a part of this original disclosure.

DETAILED DESCRIPTION OF THE PRESENT INVENTION

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Configuration of Laminated Body 100

Figure 1:
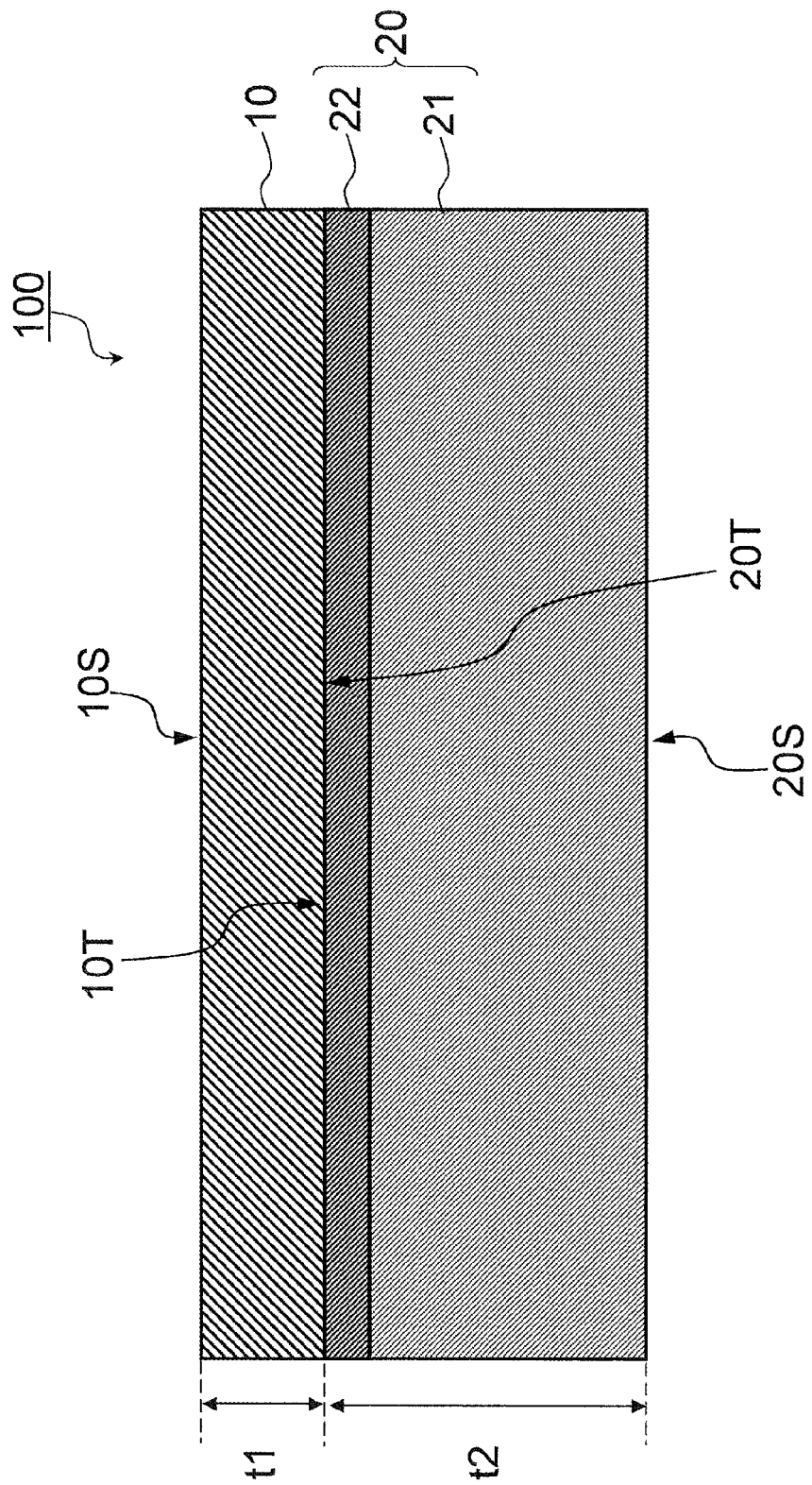
FIG. 1 is a sectional view illustrating the configuration of a laminated body.

The configuration of the laminated body 100 will be described making reference to the figures. FIG. 1 is a sectional view illustrating the configuration of the laminated body 100.

The laminated body 100 is preferably used as an outer covering for an electronic device (digital camera, IC recorder, or the like). The laminated body 100 is formed in a tabular configuration. The laminated body 100 includes a first tabular member 10, and a second tabular member 20. The first tabular member 10 and the second tabular member 20 constitute a main body according to the present embodiment.

The first tabular member 10 is formed in a tabular configuration. The first tabular member 10 includes a first outer surface 10S (an example of an outer surface), and a first inner surface 10T provided to face the first outer surface 10S. The first tabular member 10 is configured from a dense ceramic material that exhibits no more than 10% porosity.

The ceramic material that configures the first tabular member 10 preferably includes use of a ceramic material with insulating properties that contains at least one of zirconia or alumina, or silicon nitride ($Si_3N_4$), or the like. However the ceramic material that configures the first tabular member 10 is not limited thereby. Due to its high mechanical strength and high toughness, use of a material having a principal constituent of partially stabilized zirconia in which yttrium oxide is added as a stabilizing agent to zirconia and the main crystalline phase is tetragonal is most preferred. In this configuration, the mechanical characteristics of the first tabular member 10 may be enhanced by addition of 2 to 6 mol % yttrium oxide to the zirconia.

The ceramic material that configures the first tabular member 10 includes use of aluminum nitride (AlN), sialon (SiAlON), silicon carbonate (SiC), or the like. The first thickness t1 of the first tabular member 10 may be at least 50 micrometers and no more than 5 mm. When the first thickness t1 of the first tabular member 10 at least 50 micrometers, sufficient wear resistance is obtained in relation to use of a laminated body 100 as an outer covering material for an electronic device in which the first tabular member 10 is used on the outermost surface.

It is preferred that the first outer surface 10S and the first inner surface 10T of the first tabular member 10 has an arithmetic mean roughness Ra of no more than 3 micrometers. Furthermore, it is preferred that the bonding force in relation to the second tabular member 20 (more specifically, the bonding surface 22 described below) of the first tabular member 10 is enhanced by causing the first inner surface 10T to be rougher than the first outer surface 10S. In order to enhance the wear resistance of the first tabular member 10, it is preferred that the arithmetic mean roughness Ra of the first outer surface 10S is no more than 0.1 micrometers.

The second tabular member 20 is formed in a tabular configuration. The second tabular member 20 is bonded to the first tabular member 10. The second thickness t2 of the second tabular member 20 may be at least 20 micrometers and no more than 20 mm. The second tabular member 20 includes a second inner surface 20T and a second outer surface 20S. The second inner surface 20T is bonded to the first inner surface 10T of the first tabular member 10. The second outer surface 20S is provided to face the second inner surface 20T.

In the present embodiment, the second tabular member 20 is configured by a supporting layer 21 and a bonding layer 22.

The supporting layer 21 is fixed to the first tabular layer 10 by the bonding layer 22. The supporting layer 21 exhibits flexibility. The supporting layer 21 is configured from a polymer material. The polymer material that configures the supporting layer 21 preferably includes a fiber reinforced plastic. A fiber reinforced plastic is a material for example in which a resin such as an epoxy or nylon impregnated in a woven or non-woven fabric such as glass fiber, carbon fiber, aramid fiber, or the like is cured. However, the polymer material that configures the supporting layer 21 is not limited thereby, and includes use of polycarbonate, nylon, or the like.

The bonding layer 22 is inserted between the first tabular member 10 and the supporting layer 21. The bonding layer 22 may be configured by a heat curable resin. The heat curable resin that configures the bonding layer 22 preferably includes use of a two-liquid type epoxy adhesive, a single-liquid type epoxy adhesive, a two-liquid type urethane adhesive, a two-liquid type olefin adhesive, a two-liquid type acrylic adhesive, or a single-liquid type acrylic adhesive. However, there is no limitation in this regard. The bonding layer 22 may be configured by a thermoplastic resin, or the like. The thickness of the bonding layer 22 in order to stabilize the mechanical characteristics of the layered body 100 preferably is no more than 0.1 mm. The mechanical characteristics of the bonding layer 22 after curing are more preferably the same as the mechanical characteristics of the supporting layer 21.

Characteristics of the Laminated Body 100

The laminated body 100 according to the present embodiment exhibits static load characteristics that are lower than a single layer body configured from the dense ceramic material that configures the first tabular member 10. That is to say, the strength of the laminated body 100 obtained from static load testing is smaller than the strength of the single layer body obtained from the same static load testing. The static load testing utilizes a so-called three point bending test (test piece dimensions: 2 mm×20 mm, application point and distance between support point: 10 mm). The third thickness t3 of the single layer body is the sum of the thickness t1 of the first tabular body 10 and the second thickness t2 of the second tabular body 20.

The laminated body 100 according to the present embodiment can withstand falling-ball impact breaking tests from a height that is higher than that exhibited by the single layer body as described above. That is to say, the impact load according to the laminated body 100 that is generated during impact with a ball can be reduced to lower than that exhibited by the single laminated body described above. In other words, the laminated body 100 can withstand an impact load that is greater than the ceramic single layer body. Therefore, the ball drop height that can be withstood by the laminated body 100 in the falling-ball impact breaking tests is higher than the ball drop height that can be withstood by the single layer body in the same falling-ball impact breaking tests. The falling-ball impact breaking tests comply with testing as specified by JIS (Japanese Industrial Standards) R 3206 or JIS K 6902.

Position of Neutral Plane U

Figure 2:
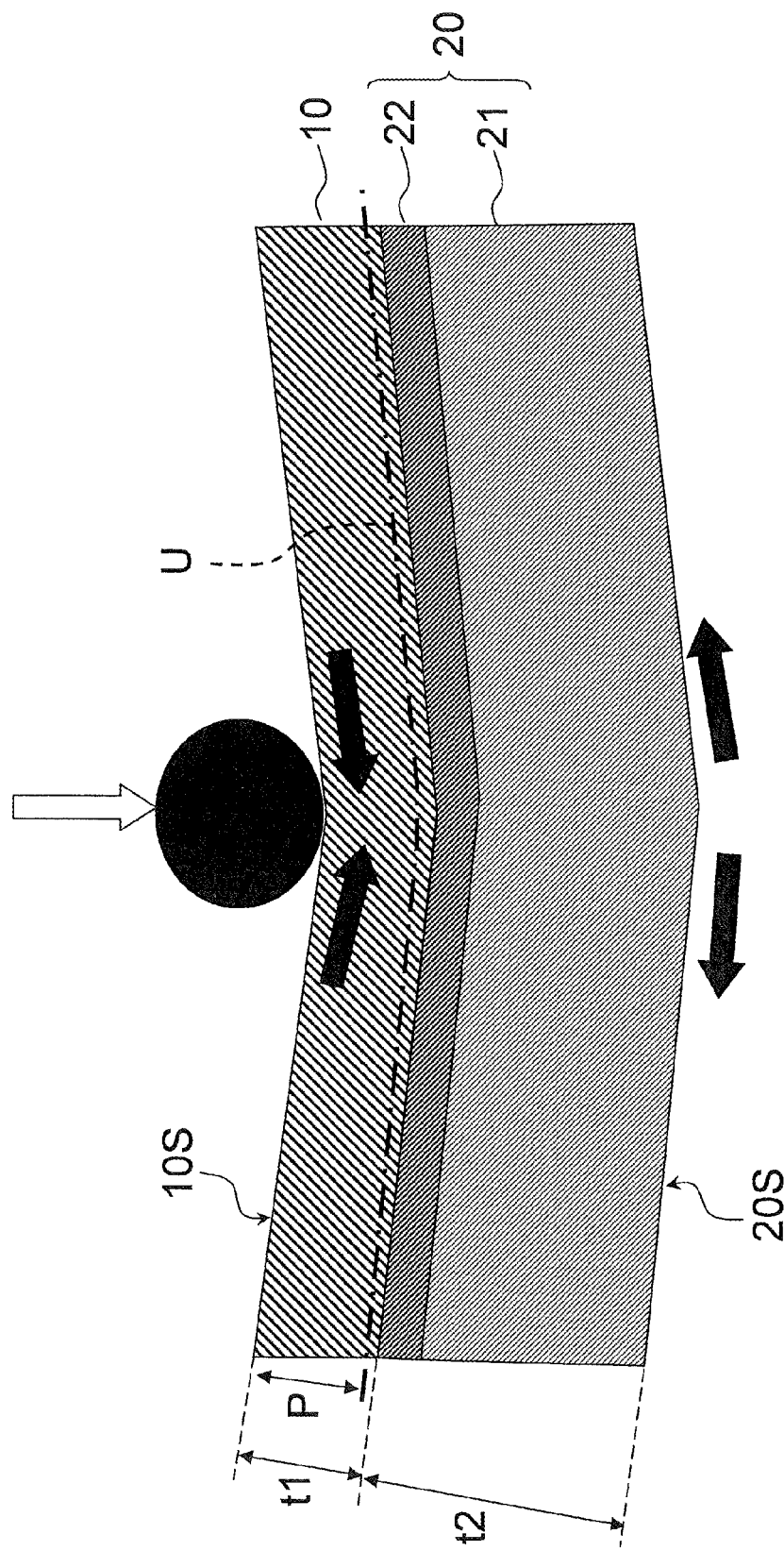
FIG. 2 is a schematic view illustrating the position of the neutral plane.

The position of the neutral plane U of the laminated body 100 will be described below making reference to the figures. FIG. 2 is a schematic view illustrating the position of the neutral plane U when the ball is dropped onto the laminated body 100 from a predetermined height. The distance P from the first outer surface 10S of the neutral plane U is obtained by Equation (1) below.

$$P = \sum_{i=1}^{n} Yi \int_{Ai} y \, dA \Big/ \sum_{i=1}^{n} YiAi \qquad (1)$$

In Equation (1), Yi denotes the average Young's modulus of the first tabular member 10 and the second tabular member 20, and Ai denotes the multiple of the respective thickness and the width of the first tabular member 10 and the second tabular member 20.

The average Young's modulus Y1 of the first tabular member 10 is preferably larger than the average Young's modulus Y2 of the second tabular member 20. The average Young's modulus Y1 of the first tabular member 10 may be 50 GPa to 500 GPa. The average Young's modulus Y2 of the second tabular member 20 may be 0.1 GPa to 100 GPa. In the present embodiment, the average Young's modulus Y2 of the second tabular member 20 is the average value of the Young's modulus of the supporting layer 21 and the Young's modulus of the bonding layer 22.

As described above, the first thickness t1 of the first tabular member 10 may be at least 50 micrometers and no more than 5 mm. The second thickness t2 of the second tabular member 20 may be at least 200 micrometers and no more than 20 mm (the thickness is adjusted to the thickness t1 of the first tabular member 10).

The distance P from the first outer surface of the neutral plane U is preferably at least 0.8 times the first thickness t1. That is to say, it is preferred that Equation (2) is satisfied between the distance P and the first thickness t1.

$$P \geq 0.8 \times t1 \qquad (2)$$

In this manner, the ball drop height that is withstood by the laminated body 100 in the falling-ball impact breaking test can be increased.

Other Embodiments

The present invention is not limited to the above embodiments, and various modifications and changes may be made within a scope that does not depart from the scope of the present invention.

For example, in the above embodiment, the laminated body 100 is configured with a two layered structure including the first tabular member 10 and the second tabular member 20. However there is no limitation in this regard. The laminated body 100 may be configured with a multi-layer structure of three or more layers.

In the above embodiment, although a single layer structure was described in relation to the first tabular member 10, there is no limitation in this regard. The first tabular member 10 may have a multilayer structure of more than two layers. In this configuration, the respective layers of the first tabular member 10 may be configured by a single ceramic material, or may be configured by a different ceramic in each layer.

In the above embodiment, although a single layer structure was described in relation to the second tabular member 20, there is no limitation in this regard. The second tabular member 20 may have a multilayer structure of more than two layers. In this configuration, the respective layers of the second tabular member 20 may be configured by a single polymer material, or may be configured by a different polymer in each layer.

Thus, the present invention of course includes various embodiments and the like that are not discussed herein. Therefore, the technological scope of the present invention is not limited to just the specific inventions pertaining to the appropriate claims from the descriptions given above.

EXAMPLES

Although the examples related to the present invention will be described below, the present invention is not limited to the examples described below.

Static Load Testing

Firstly, a ceramic plate (2 mm×20 mm) configured from the material shown in Table 1 was prepared. The thickness and Young's modulus of the respective ceramic plates is shown in Table 1. The Comparative Examples 1 to 9 configure a ceramic-plate single layer body as a test piece for static load testing.

Next, a resin plate (2 mm×20 mm) that is configured from the polymer material shown in Table 1 is bonded to the ceramic plate according to Examples 1 to 14. The Young's modulus Y2 and the thickness t2 of each resin plate is shown in Table 1. An epoxy adhesive agent was used to bond the ceramic plate and the resin plate. The thickness of the epoxy adhesive agent after curing is 0.02 mm. Examples 1 to 14 use a test piece for static load tests that is configured from a laminated body of a ceramic plate and a resin plate.

Figure 3B:
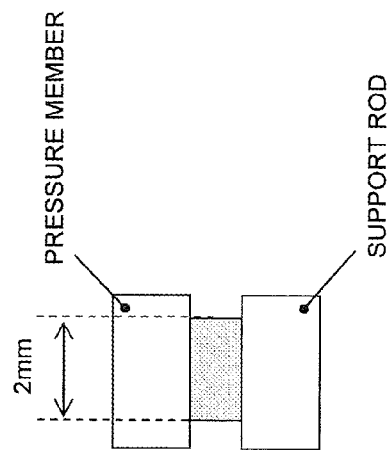
FIG. 3B is a side view illustrating a method of testing static load.
Figure 3A:
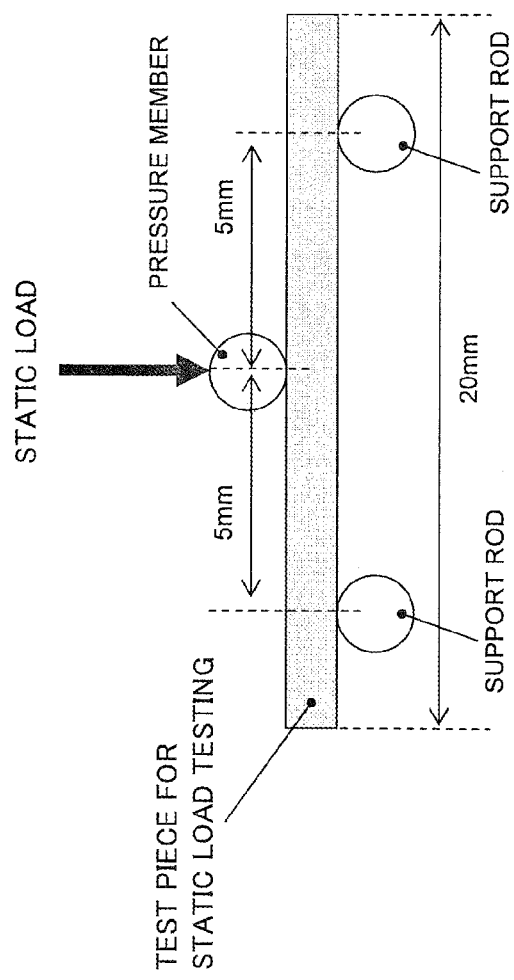
FIG. 3A is a front view illustrating a method of testing static load.

Next, as illustrated in FIG. 3A and FIG. 3B, the test piece for static load tests is disposed equidistantly on two support rods that are fixed to positions separated by 10 mm, and a pressure member is pressed into the center until the test piece for static load tests becomes bent. The static load when the test piece for static load tests became bent is shown in Table 1.

Falling-ball Impact Breaking Test

A ceramic plate (□40 mm) configured from the material shown in Table 1 is prepared. The Young's modulus and thickness of each ceramic plate is shown in Table 1. Comparative Examples 1 to 9 use a test piece for falling-ball impact breaking tests that is configured from a single layer body of only a ceramic plate.

Next, the resin plate (□40 mm) that is configured from the polymer material shown in Table 1 is bonded to the ceramic plate according to Examples 1 to 14. The thickness and the Young's modulus of the respective resin plates are shown in Table 1. The bonding of the ceramic plate and the resin plate is performed using an epoxy adhesive agent. The thickness of the epoxy adhesive agent after curing is 0.02 mm. Examples 1 to 14 use a test piece for falling-ball impact breaking testing that is configured from a laminated body including the ceramic plate and the resin plate.

Next, a steel ball (mass 20 g, Φ 17 mm) is dropped onto the center of the test piece for falling-ball impact breaking testing and the height when the ceramic plate cracks and fractures is measured. The height when a fracture is produced in the test piece for falling-ball impact breaking testing is shown in Table 1. The details of the falling-ball impact breaking tests described above are executed in accordance with JIS R 3206 or JIS K 6902.

TABLE 1

| TEST PIECE | CERAMIC PLATE MATERIAL | Young's modulus Y1 (GPa) | Thickness t1 (mm) | RESIN PLATE MATERIAL | Young's modulus Y2 (GPa) | Thickness t2 (mm) | The distance P from the first outer surface of the neutral plane (mm) | The position of the neutral surface (P/t1) | Total thickness (mm) | Static load (N) | Ball drop height (cm) |
|---|---|---|---|---|---|---|---|---|---|---|---|
| Example 1 | $ZrO_2$ 80% + $Al_2O_3$ 20% | 252 | 0.15 | Glass epoxy(EPOXY/GF) | 23 | 0.50 | 0.154 | 1.13 | 0.67 | 62.3 | 81 |
| Example 2 | $ZrO_2$ 80% + $Al_2O_3$ 20% | 252 | 0.15 | Glass epoxy(EPOXY/GF) | 23 | 0.60 | 0.179 | 1.31 | 0.77 | 78.0 | 124 |
| Example 3 | $ZrO_2$ 80% + $Al_2O_3$ 20% | 252 | 0.15 | Nylon86/CF | 28 | 0.50 | 0.167 | 1.22 | 0.67 | 52.1 | 56 |
| Example 4 | $ZrO_2$ 80% + $Al_2O_3$ 20% | 252 | 0.15 | Nylon66/CF | 20 | 0.50 | 0.146 | 1.06 | 0.67 | 56.6 | 67 |
| Example 5 | $ZrO_2$ 80% + $Al_2O_3$ 20% | 252 | 0.15 | EPOXY/CF | 60 | 0.40 | 0.188 | 1.41 | 0.57 | 55.8 | 79 |
| Example 6 | $ZrO_2$ 80% + $Al_2O_3$ 20% | 252 | 0.10 | Glass epoxy(EPOXY/GF) | 23 | 0.50 | 0.149 | 1.68 | 0.62 | 53.4 | 60 |
| Example 7 | $ZrO_2$ 80% + $Al_2O_3$ 20% | 252 | 0.20 | Glass epoxy(EPOXY/GF) | 23 | 0.60 | 0.189 | 1.01 | 0.82 | 43.5 | 60 |
| Example 8 | $ZrO_2$ 80% + $Al_2O_3$ 20% | 252 | 0.25 | Glass epoxy(EPOXY/GF) | 23 | 0.60 | 0.204 | 0.86 | 0.87 | 102.3 | ≥200 |
| Example 9 | $ZrO_2$ | 200 | 0.15 | Glass epoxy(EPOXY/GF) | 23 | 0.50 | 0.169 | 1.24 | 0.67 | 46.9 | 107 |
| Example 10 | $Si_3N_4$ | 300 | 0.15 | Glass epoxy(EPOXY/GF) | 23 | 0.50 | 0.144 | 1.05 | 0.67 | 56.0 | 65 |
| Example 11 | $ZrO_2$ 80% + $Al_2O_3$ 20% | 252 | 0.05 | Glass epoxy(EPOXY/GF) | 23 | 0.50 | 0.163 | 3.85 | 0.57 | 33.1 | 54 |
| Example 12 | $ZrO_2$ 80% + $Al_2O_3$ 20% | 252 | 0.20 | Nylon66/CF | 20 | 0.40 | 0.143 | 0.76 | 0.62 | 43.0 | 26 |
| Example 13 | $ZrO_2$ 80% + $Al_2O_3$ 20% | 252 | 0.30 | Glass epoxy(EPOXY/GF) | 23 | 0.50 | 0.205 | 0.71 | 0.82 | 68.3 | 34 |
| Example 14 | $ZrO_2$ 80% + $Al_2O_3$ 20% | 252 | 0.45 | Glass epoxy(EPOXY/GF) | 23 | 1.50 | 0.456 | 1.05 | 1.97 | 327.5 | ≥200 |
| Comparative Example 1 | $ZrO_2$ 80% + $Al_2O_3$ 20% | 252 | 0.57 | — | — | — | — | — | 0.57 | 62.8 | 18 |
| Comparative Example 2 | $ZrO_2$ 80% + $Al_2O_3$ 20% | 252 | 0.62 | — | — | — | — | — | 0.62 | 67.6 | 21 |
| Comparative Example 3 | $ZrO_2$ 80% + $Al_2O_3$ 20% | 252 | 0.67 | — | — | — | — | — | 0.67 | 82.3 | 26 |
| Comparative Example 4 | $ZrO_2$ 80% + $Al_2O_3$ 20% | 252 | 0.77 | — | — | — | — | — | 0.77 | 96.4 | 29 |
| Comparative Example 5 | $ZrO_2$ 80% + $Al_2O_3$ 20% | 252 | 0.82 | — | — | — | — | — | 0.82 | 107.0 | 31 |
| Comparative Example 6 | $ZrO_2$ 80% + $Al_2O_3$ 20% | 252 | 0.87 | — | — | — | — | — | 0.87 | 125.2 | 40 |
| Comparative Example 7 | $ZrO_2$ 80% + $Al_2O_3$ 20% | 252 | 1.97 | — | — | — | — | — | 1.97 | 513.8 | 171 |
| Comparative Example 8 | $ZrO_2$ | 200 | 0.67 | — | — | — | — | — | 0.67 | 76.3 | 26 |
| Comparative Example 9 | $Si_3N_4$ | 300 | 0.67 | — | — | — | — | — | 0.67 | 77.6 | 31 |

As shown in Table 1, when the total thickness is the same, the static load in Examples 1 to 14 is confirmed to be smaller than the static load in Comparative Examples 1 to 9. For example, when test pieces with a total thickness of 0.57 mm are considered, the static load in Example 5 is 55.8N and the static load in Example 11 is 33.1N, while the static load in Comparative Example 1 is 62.8N.

Furthermore, as shown in Table 1, when the total thickness is the same, the ball drop height in Examples 1 to 14 is confirmed to be higher than the ball drop height in Comparative Examples 1 to 9. For example, when test pieces with a total thickness of 0.57 mm are considered, the ball drop height in Example 5 is 79 cm and the ball drop height in Example 11 is 54 cm, while the ball drop height in Comparative Example 1 is 18 cm.

As shown in Table 1, Examples 1 to 11 and Example 14 could withstand a ball drop height of at least 40 cm. This is due to the suppression of the tensile stress applied to the ceramic plate as a result of a positioning on the interface side of the ceramic plate and the resin plate even when the neutral plane is in the ceramic plate. On the other hand, Examples 12 and 13 could not withstand a ball drop height of less than 40 cm. This is due to the fact that the tensile stress applied to the ceramic plate was increased as a result of a positioning of the neutral surface deep in the ceramic plate inner portion. Therefore, it was shown that it is preferable that the neutral plane is separated from the ceramic plate surface by at least 0.8 times the ceramic plate thickness in order to withstand a ball drop test from a predetermined height.

What is claimed is:

1. A laminated body comprising:
    a main body including a first tabular member and a second tabular member, the first tabular member configured from a ceramic material and having a first thickness, the second tabular member configured from a polymer material and having a second thickness,
    wherein the main body is configured to withstand a falling-ball impact breaking test from a height that is higher than a height exhibited by a single layer body which is configured from the ceramic material and of a thickness that is the sum of the first thickness and the second thickness;
    wherein the first tabular member includes an outer surface, and
    a neutral plane of the main body is separated by at least 0.8 times the first thickness from the outer surface;
    wherein a distance of the neutral plane from the outer surface is given by the following equation;

$$P = \sum_{i=1}^{n} Y_i \int_{A_i} y\, dA \bigg/ \sum_{i=1}^{n} Y_i A_i;$$

and
    wherein, in Equation 1, Yi denotes an average Young's modulus of the first tabular member and the second tabular member, and Ai denotes a multiple of the respective thickness and a width of the first tabular member and the second tabular member.

2. The laminated body according to claim 1, wherein the first tabular member is at least 50 micrometers.

3. The laminated body according to claim 1, wherein an average Young's modulus of the first tabular member is larger than an average Young's modulus of the second tabular member.

4. The laminated body according to claim 1, wherein the first tabular member is configured by at least one of zirconia and alumina.

5. The laminated body according to claim 1, wherein the second tabular member comprises a flexible supporting layer and a bonding layer which is interposed between the supporting layer and the first tabular member.

6. The laminated body according to claim 5, wherein the supporting layer is configured by a fiber reinforced plastic.

7. The laminated body according to claim 1, wherein the main body configured to have static load characteristics that are lower than the single layer body of the thickness that is the sum of the first thickness and the second thickness.

* * * * *